United States Patent [19]

Chi

[11] Patent Number: 5,291,797
[45] Date of Patent: Mar. 8, 1994

[54] UPPER STEERING ASSEMBLY

[76] Inventor: Yi C. Chi, No. 139-5, An Mei Rd., Mei Shan Village, Hou Li Hsiang, Taichung Hsien, Taiwan

[21] Appl. No.: 78,399

[22] Filed: Jun. 17, 1993

[51] Int. Cl.⁵ .................. B62K 21/12; F16C 43/00
[52] U.S. Cl. .................. 74/551.1; 280/279; 384/540; 403/24
[58] Field of Search .............. 74/551.1, 551.2, 551.3, 74/551.4; 280/279, 280; 384/517, 518, 500, 516, 540; 403/24, 320, 388

[56] References Cited

U.S. PATENT DOCUMENTS

| | | | |
|---|---|---|---|
| 555,150 | 2/1896 | Dieterich et al. | 74/551.1 |
| 575,109 | 1/1897 | Gulick | 74/551.1 |
| 627,187 | 6/1899 | Hall | 74/551.1 |
| 2,500,909 | 3/1950 | Winby | 285/86 |
| 3,304,099 | 2/1967 | Jankowski | 280/287 |
| 3,306,684 | 2/1967 | Klein | 280/279 |
| 3,902,816 | 9/1975 | Moore | 403/114 |
| 4,068,961 | 1/1978 | Ebner et al. | 403/55 |
| 4,189,167 | 2/1980 | Dubois | 280/279 |
| 4,274,301 | 6/1981 | Katayama | 74/551.1 |
| 4,323,263 | 4/1982 | Cook et al. | 280/279 |
| 4,340,238 | 7/1982 | Cabeza | 280/279 |
| 4,410,197 | 10/1983 | St. Hillaire | 280/279 |
| 4,436,468 | 3/1984 | Ozaki et al. | 280/279 X |
| 4,445,703 | 5/1984 | Tange | 280/279 |
| 4,531,756 | 7/1985 | Mori | 280/279 |
| 4,545,691 | 10/1985 | Kastan et al. | 384/458 |
| 4,635,768 | 3/1987 | Keys et al. | 280/279 |
| 4,708,574 | 11/1987 | Conboy et al. | 414/591 |
| 4,722,502 | 2/1988 | Mueller et al. | 248/284 |
| 4,770,435 | 9/1988 | Cristie | 280/279 |
| 4,890,947 | 1/1990 | Williams et al. | 403/16 |
| 4,915,535 | 4/1990 | Willetts | 403/191 |
| 4,960,342 | 10/1990 | Chi | 403/320 X |
| 5,085,063 | 2/1992 | Van Dyke et al. | 280/279 X |
| 5,095,770 | 3/1992 | Rader, III | 74/551.1 |
| 5,160,210 | 11/1992 | Chen | 403/24 |
| 5,163,758 | 11/1992 | Chi | 384/540 |
| 5,178,035 | 1/1993 | D'Aluisio | 74/551.1 |
| 5,197,349 | 3/1993 | Herman | 74/551.1 |
| 5,201,242 | 4/1993 | Chi | 74/551.1 |
| 5,201,244 | 4/1993 | Stewart et al. | 74/551.3 |

FOREIGN PATENT DOCUMENTS

| | | | |
|---|---|---|---|
| 561703 | 10/1923 | France | 280/279 |
| 2373423 | 10/1978 | France | 74/551.1 |
| 1-266086 | 10/1989 | Japan | 280/279 |

*Primary Examiner*—Vinh T. Luong
*Attorney, Agent, or Firm*—Woodcock Washburn Kurtz Mackiewicz & Norris

[57] ABSTRACT

An upper steering assembly for a bicycle includes a lower race mounted on an upper end of a head tube of a bicycle, an upper race above the lower race, ball bearings between the lower and upper races, a compression socket, a ratchet wheel, an outer socket, a compression ring, and an actuating socket. The steerer tube has a longitudinal groove on an upper section thereof. The compression socket is mounted around the steerer tube and has a longitudinal slit in alignment with the longitudinal groove. The ratchet wheel is mounted around the compression socket and has a protrusion projecting radially and inwardly through the slit and received in the longitudinal groove. The outer socket is mounted around the ratchet wheel and has a radial threaded through hole through which a bolt passes to abut on a tooth of the ratchet wheel, such that the ratchet wheel cannot rotate. The compression ring is mounted around an upper section of the compression socket and has a stop projecting radially and inwardly through the slit and received in the longitudinal groove. The actuating socket is mounted around the compression ring and has inner threadings to engage with upper threading section of the compression socket.

7 Claims, 3 Drawing Sheets

5,291,797

UPPER STEERING ASSEMBLY

BACKGROUND OF THE INVENTION

1. Field of the Invention

The present invention relates to an upper steering assembly for a bicycle.

2. Description of Related Art

U.S. Pat. No. 5,095,770 to Rader, III discloses a steering bearing assembly for wheeled vehicle which includes a force means for exerting a radial force between the smooth outer surface of the steerer tube and the second race to push the second race toward the first race and to fix the second race on the steerer tube. Such a structure still, however, tends to be worn and thus loosened when on a rugged road as being subjected to up and down shock.

The present invention provides an improved upper steering assembly to mitigate and/or obviate the above-mentioned drawbacks.

SUMMARY OF THE INVENTION

The present invention provides an upper steering assembly which includes a bearing means, a compression socket, a ratchet wheel, an outer socket, a compression ring, and an actuating socket. The bearing means includes a lower race mounted on the upper end of the head tube, an upper race above the lower race, and ball bearings between the lower and upper races.

The steerer tube includes a longitudinal groove on an upper section thereof and the compression socket is mounted around the steerer tube with a longitudinal slit thereof in alignment with the longitudinal groove. The ratchet wheel is mounted around the compression socket and has a protrusion projecting radially and inwardly from an inner periphery thereof through the slit and thus is received in the longitudinal groove. The outer socket is mounted around the ratchet wheel and has a radial threaded through hole through which a bolt passes so as to abut on a tooth of the ratchet wheel, such that the ratchet wheel cannot rotate. The outer socket has an annular groove in an outer periphery thereof so as to receive the upper edge of the upper race. The outer socket includes inner threadings to engage with the lower outer threadings on the outer periphery of the compression socket and has an inner annular groove to receive the ratchet wheel.

The compression ring is mounted around the upper section of the compression socket and has a stop projecting radially and inwardly from an inner periphery thereof through the slit and thus is received in the longitudinal groove. The actuating socket is mounted around the compression ring and has inner threading to engage with upper threading section of the compression socket.

By such an arrangement, when the user rotates the actuating socket, the compression socket is compressed by the compression ring and thus tightly clamps the steerer tube. Due to the provision of the stop in the longitudinal groove, the compression ring does not rotate and thus can securely retain the compression socket under the rotation of the actuating socket. Furthermore, as the projection is also received in the longitudinal groove and a bolt is inserted through the threaded hole to contact with one of the teeth of the ratchet wheel, the ratchet wheel cannot rotate to further retain the compression socket, i.e., loosening of the compression socket is avoided unless the bolt is removed.

Preferably, a waterproof gasket is provided around the compression socket between the outer socket and the actuating socket.

Other objects, advantages, and novel features of the invention will become more apparent from the following detailed description when taken in conjunction with the accompanying drawings.

DESCRIPTION OF THE PREFERRED EMBODIMENT

Figure 1:
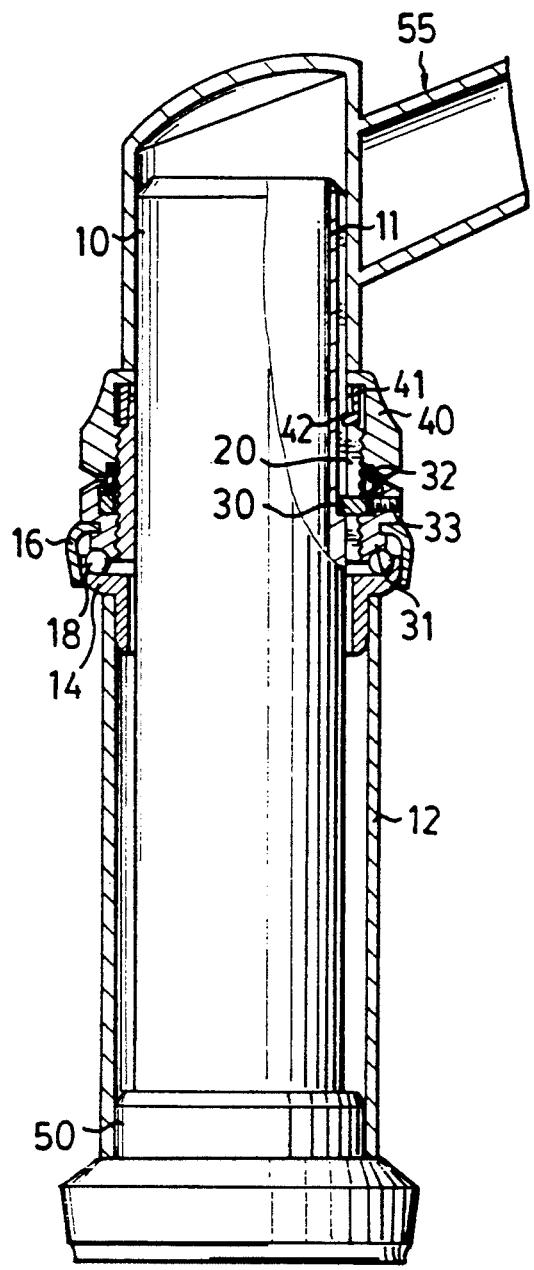
FIG. 1 is a cross-sectional view of a bicycle steering assembly in accordance with the present invention.
Figure 2:
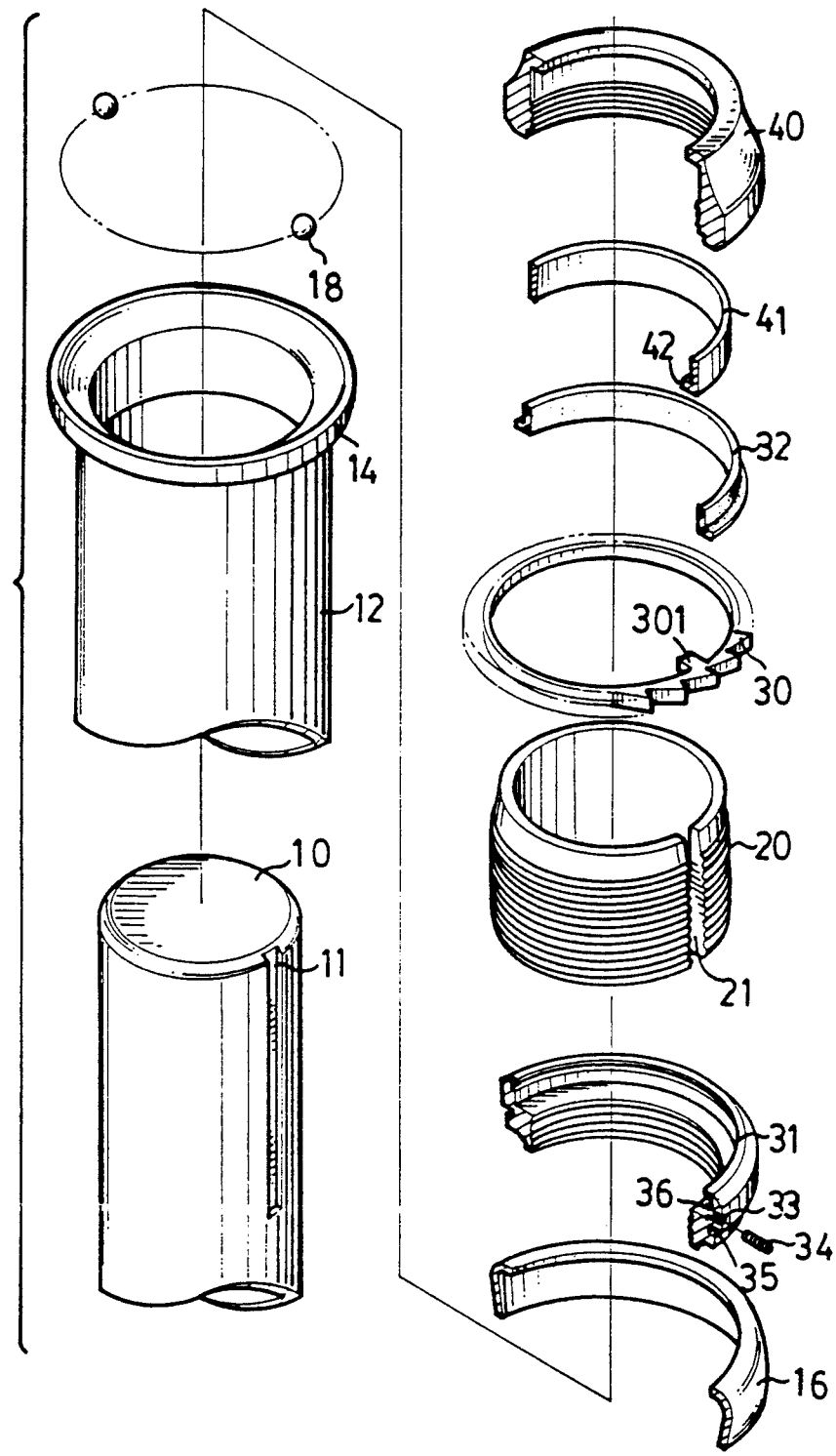
FIG. 2 is an exploded view of the upper bearing assembly in accordance with the present invention.
Figure 3:
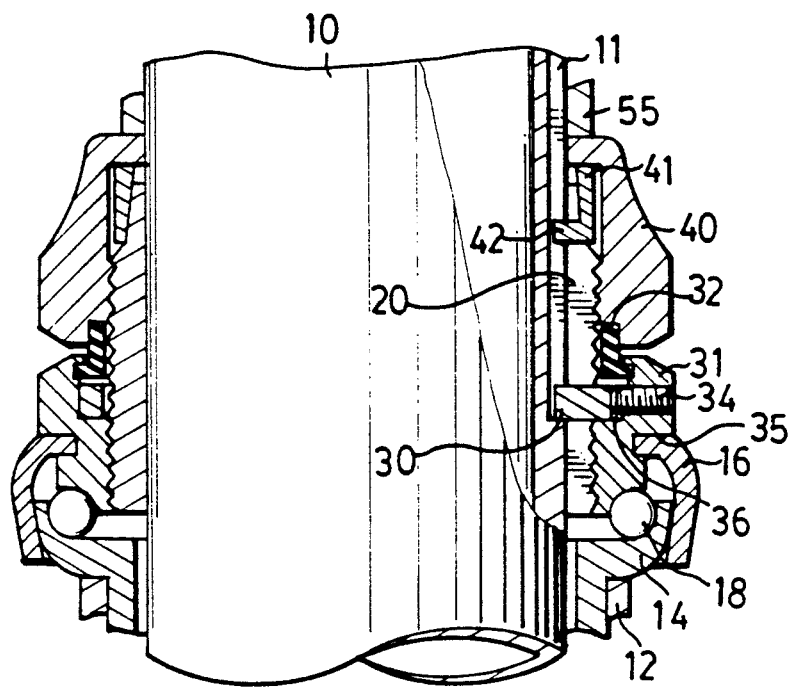
FIG. 3 is a partial cross-sectional view, at an enlarged scale, showing upper steering assembly in accordance with the present invention.

Referring to FIGS. 1 through 3, the upper steering assembly in accordance with the present invention generally includes a bearing means, a compression socket 20, a ratchet wheel 30, an outer socket 31, a compression ring 41, and an actuating socket 40. The bearing means includes a lower race 14 mounted on an upper end of the bicycle head tube 12, an upper race 16 above the lower race 14, and ball bearings 18 between the lower and upper races 14 and 16.

As shown in the figures, the steerer tube 10 includes a longitudinal groove 11 on an upper section thereof and the compression socket 20 is mounted around the steerer tube 10 with a longitudinal slit 21 thereof in alignment with the longitudinal groove 11. The ratchet wheel 30 is mounted around the compression socket 20 and has a protrusion 301 projecting radially and inwardly from an inner periphery thereof through the slit 21 and thus is received in the longitudinal groove 11. The outer socket 31 is mounted around the ratchet wheel 30 and has a radial threaded through hole 33 through which a bolt 34 passes so as to abut on a tooth of the ratchet wheel 30, such that the ratchet wheel 31 cannot rotate. As shown in FIGS. 2 and 3, the outer socket 31 has an annular groove 35 in an outer periphery thereof so as to receive the upper edge of the upper race 16. The outer socket 31 further includes inner threadings to engage with the lower outer threadings on the outer periphery of the compression socket 20 and has an inner annular groove 36 in an inner periphery thereof to receive the ratchet wheel 30.

The compression ring 41 is mounted around the upper section of the compression socket 20 and has a stop 42 projecting radially and inwardly from an inner periphery thereof through the slit 21 and thus received in the longitudinal groove 11. Preferably, the smooth upper section of the outer periphery of the compression socket 20 tapers upward, and the compression ring has correspondingly tapered inner periphery. The actuating socket 40 is mounted around the compression ring 41 and has inner threading to engage with outer upper threading section of the compression socket 20. As can be seen in FIG. 1, a handlebar stem 55, which encloses the upper section of the steerer tube 10 whose lower end is equipped with a conventional lower bearing assembly 50, is provided above the actuating socket 40 in a conventional manner.

By such an arrangement, when the user rotates the actuating socket 40, the compression socket 20 is compressed by the compression ring 41 and thus tightly clamps the steerer tube 10. Due to the provision of the stop 42 in the longitudinal groove 11, the compression ring 41 does not rotate and thus can securely retain the compression socket 20 under the rotation of the actuating socket 40. Furthermore, as the projection 301 is received in the longitudinal groove 11 and a bolt 34 is inserted through the radial threaded hole 33 to contact with one of the teeth of the ratchet wheel 30, the ratchet wheel 30 cannot turn to further retain the compression socket 20, i.e., loosening of the compression socket 20 is avoided unless the bolt 34 is removed.

Preferably, a waterproof gasket 32 is provided around the compression socket 20 between the outer socket 31 and the actuating socket 40.

Although the invention has been explained in relation to its preferred embodiment, it is to be understood that many other possible modifications and variations can be made without departing from the spirit and scope of the invention as hereinafter claimed.

I claim:

1. An upper steering assembly for a bicycle comprising:
    a steerer tube (10) with a longitudinal groove (11) on an upper section thereof and passing through a bicycle head tube (12);
    a compression socket (20) mounted around the steerer tube (10), being threaded on an outer periphery thereof and having a longitudinal slit (21) in alignment with the longitudinal groove (11);
    a ratchet wheel (30) mounted around the compression socket (20) and having a protrusion (301) projecting radially and inwardly through the slit (21) and received in the longitudinal groove (11);
    an outer socket (31) mounted around the ratchet wheel (30) and having a radial threaded through hole (33) through which a bolt (34) passes to abut on a tooth of the ratchet wheel (30) to retain the ratchet wheel (30);
    a compression ring (41) mounted around an upper section of the compression socket (20) and having a stop (42) projecting radially and inwardly through the slit (21) and received in the longitudinal groove (11); and
    an actuating socket (40) mounted around the compression ring (41) and having inner threadings to engage with an upper section of the outer threadings of the compression socket (20).

2. The upper steering assembly as claimed in claim 1 further comprising a lower race (14) mounted on an upper end of the head tube (12), an upper race (16) above said lower race (14), and a plurality of ball bearings (18) between said lower and upper races (14 and 16).

3. The upper steering assembly as claimed in claim 2 wherein the outer socket (31) has an annular groove (35) in an outer periphery thereof to receive an upper edge of the upper race (16).

4. The upper steering assembly as claimed in claim 1 wherein the outer socket (31) includes inner threadings to engage with a lower section of the outer threadings of the compression socket (20).

5. The upper steering assembly as claimed in claim 1 wherein the outer socket (31) has an inner annular groove (36) in an inner periphery thereof to receive the ratchet wheel (36) and communicate with the threaded radial through hole (33).

6. The upper steering assembly as claimed in claim 1 wherein a waterproof gasket (32) is provided around the compression socket (20) between the outer socket (31) and the actuating socket (40).

7. The upper steering assembly as claimed in claim 1 wherein the upper section of the outer periphery of the compression socket (20) is smooth and tapers upward, and the compression ring (41) has correspondingly tapered inner periphery.

* * * * *